United States Patent
McGowan et al.

(10) Patent No.: US 6,577,909 B1
(45) Date of Patent: Jun. 10, 2003

(54) METHOD FOR AUTOMATICALLY SHUTTING DOWN A MACHINE DURING AN OPERATOR'S ABSENCE

(75) Inventors: Mitchell J. McGowan, Groveland, IL (US); Dean J. Schlickbernd, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/282,113

(22) Filed: Mar. 31, 1999

(51) Int. Cl.[7] .................................................. G05B 9/02
(52) U.S. Cl. ...................... 700/79; 180/271; 180/272; 180/273; 701/54; 701/86; 700/21
(58) Field of Search .............................. 701/29, 31, 36, 701/49, 54, 86; 180/271, 272, 273; 700/21, 79; 280/780.1, 735

(56) References Cited

U.S. PATENT DOCUMENTS

| | | | | | |
|---|---|---|---|---|---|
| 3,680,533 A | * | 8/1972 | Soberski | .................. | 123/117 R |
| 4,367,709 A | * | 1/1983 | Codrington | .................. | 123/339 |
| 4,381,042 A | * | 4/1983 | Perry | .......................... | 180/272 |
| 4,653,445 A | * | 3/1987 | Book et al. | ........... | 123/198 DC |
| 5,219,413 A | * | 6/1993 | Lineberger | .................. | 180/272 |
| 5,706,909 A | * | 1/1998 | Bevins et al. | ................ | 180/273 |
| 5,931,254 A | * | 8/1999 | Loraas et al. | ............... | 180/272 |
| 5,990,800 A | * | 11/1999 | Tamaki et al. | ........... | 123/179.2 |
| 6,131,539 A | * | 10/2000 | Thomas | .................... | 123/41.15 |
| 6,167,746 B1 | * | 1/2001 | Gammenthaler | ........... | 73/19.01 |
| 6,202,014 B1 | * | 3/2001 | Brandt et al. | ................. | 701/50 |
| 6,249,215 B1 | * | 6/2001 | Dilz et al. | ................... | 340/426 |
| 6,356,819 B1 | * | 3/2002 | Winslow | ..................... | 701/23 |

* cited by examiner

Primary Examiner—John Follansbee
Assistant Examiner—Ronald D Hartman, Jr.
(74) Attorney, Agent, or Firm—Kelsey L. Milman; W. Bryan McPherson, III

(57) ABSTRACT

The present invention provides a method for automatically shutting down an engine on a machine in during an operators absence in order to prevent potential damage to the machine. A determination is made regarding if the machine is running, and an if an operator is not present. In the preferred embodiment a plurality of predetermined shutdown values, which correspond with at least one of a plurality of critical parameters, are stored in the controller. The machine will shutdown if the critical parameters are determined to be beyond the shutdown values. Additionally, a cool down feature, if enabled, will cause the machine to cool down prior to the machine being shutdown.

4 Claims, 3 Drawing Sheets

METHOD FOR AUTOMATICALLY SHUTTING DOWN A MACHINE DURING AN OPERATOR'S ABSENCE

TECHNICAL FIELD

This invention relates generally to a method for preventing potential damage to a machine and more particularly to a method for automatically shutting down a machine during an operators absence.

BACKGROUND ART

In excavators and other machines, monitoring and diagnostic devices are typically employed to detect the presence of various undesirable operating conditions, such as overheating of the engine, low engine oil pressure, low coolant level, high hydraulic oil temperature, low implement oil pressure, and the like. Usually, these devices are connected to electronic control systems, for example electronic engine controls, electronic transmission controls, and the like. Indicators are provided to warn the operator of such conditions, thereby providing the operator an opportunity to take appropriate action. Damage to the machine and/or components could occur if the undesirable operating conditions were ignored.

However, machines may be left unattended by an operator while the machine is running. For example, the operator may leave a running machine to survey the surrounding area, or during a shift change. Also, when a machine is initially started in a cold climate, it is not uncommon to leave a machine unattended while it is warming up. During the time a machine is left running while no operator is present on the machine, undesirable operating conditions may occur. For example, a leak in the engine oil line may cause the lubricating fluid to be reduced to a level where the pistons may stick to the cylinders and cause the engine to seize. Without an operator present to take appropriate action, damage may occur to the machine. This, and other types of damage are counterproductive in both repair cost, and time loss due to an inoperative machine.

The present invention is directed to overcoming one or more of the problems as set forth above.

DISCLOSURE OF THE INVENTION

In one aspect of the present invention, a method for automatically shutting down a machine during an operators absence is disclosed. The machine has a controller, a machine control system, and an engine control system. A plurality of predetermined values are stored in the controller. A determination is made regarding if the machine is running, and if an operator is not present. Additionally, a determination is made in regard to at least one of a plurality of critical parameters being changed beyond a predetermined value. The machine shutdown is activated in response to determining if at least one of the plurality of critical parameters has changed beyond the predetermined value.

In a second aspect of the present invention, a method for automatically shutting down a machine is disclosed. The machine has a controller, a machine control system, and an engine control system. A plurality of predetermined values, and a plurality of cool down values, are stored in the controller. A determination is made regarding if the machine is running, and if an operator is present. Additionally, a determination is made in regard to at least one of a plurality of critical parameters being changed beyond a predetermined value. A determination is made regarding the cool down feature being enabled, and enabling at least one of a hydraulic cooling fan system and an engine cooling fan system in response to determining if the cool down feature is enabled. The machine shutdown is activated in response to determining if at least one of the plurality of critical parameters has changed beyond the predetermined value.

These and other aspects and advantages of the present invention, as defined by the appended claims, will be apparent to those skilled in the art from reading the following specification in conjunction with the drawings and the claims.

BRIEF DESCRIPTION OF THE DRAWINGS

For a better understanding of the invention, reference may be made to the accompanying drawings, in which.

BEST MODE FOR CARRYING OUT THE INVENTION

The present invention provides a method for automatically shutting down a machine during an operators absence. In the preferred embodiment, when undesirable operating conditions are detected in the machine during an operators absence, the machine will automatically shut down. The following description uses an excavator as an example only. This invention can be applied to other types of machines were operators will leave the machine running while unattended. Other examples of machines are loaders, tractors, and some types of trucks.

Figure 1:
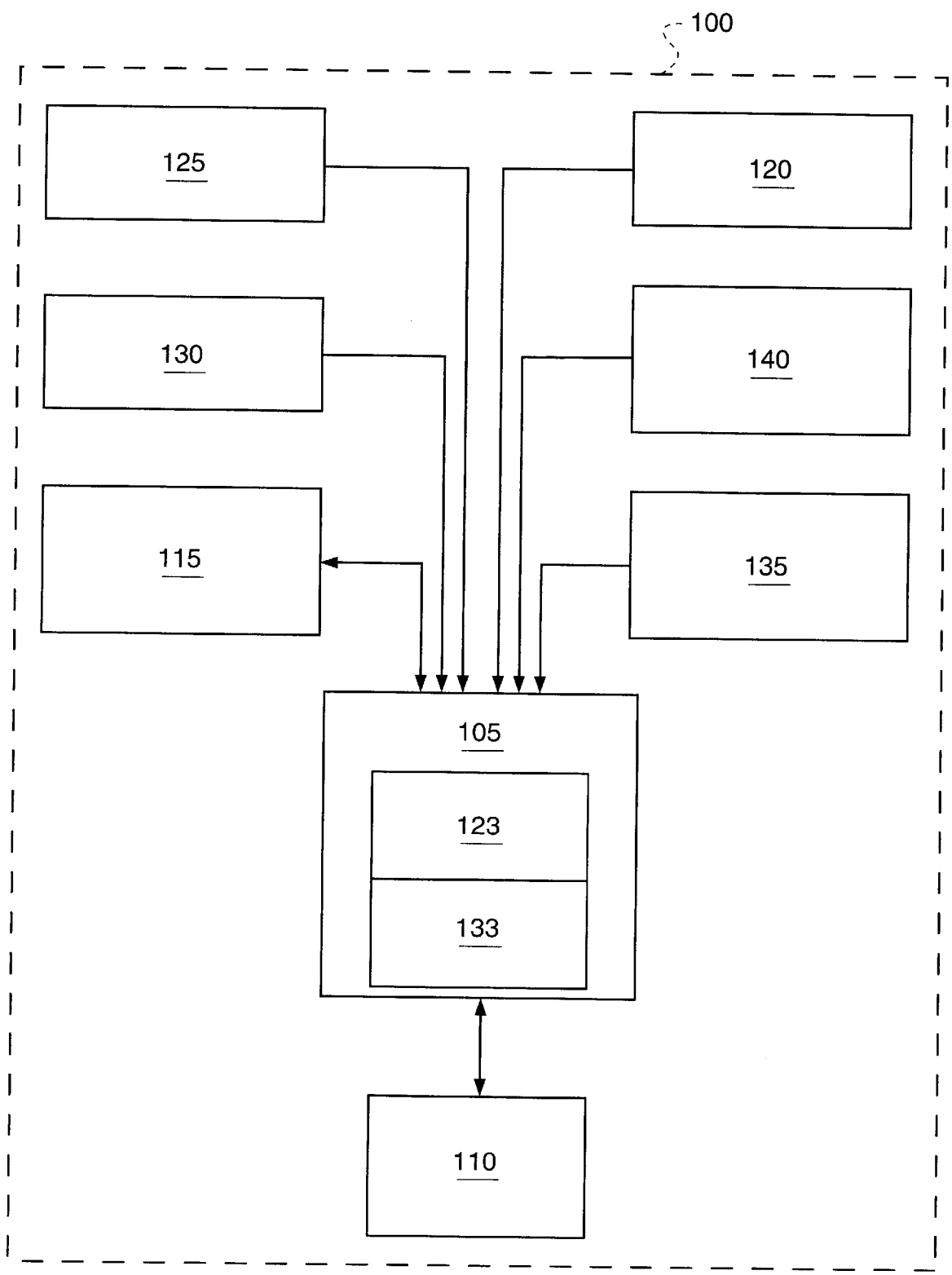
FIG. 1 is a block diagram illustrating an embodiment of the machine.

Referring to FIG. 1 a block diagram illustrating an embodiment of the machine 100 is shown. The machine 100 includes a controller 105 in communication with an engine control system 110 and a machine control system 115. The controller 105 used in the preferred embodiment is a Motorola microcontroller, model no. 68-336. However, many suitable controllers may be used in connection with the present invention, as would be known to one skilled in the art.

Engine control system 110 are well known in the art. In the preferred embodiment, the engine control system 110 includes a fuel injection system of the type used to produce injection timing strategies, and to controllably delivering air/fuel injections to the cylinders based on the injection timing strategies. Additionally, the engine control system includes the means for managing the air inlet and exhaust systems located on the machine.

Machine control systems 115 are also, well known in the art. The machine control system 115 may include an electro-hydraulic control system of the type used to operate the various pumps, valves, hydraulic cylinders, motor/steering mechanisms and other controls used in machines. Additionally, the machine control system 115 can provide an operator assist to minimize machine work and limit the manual controls if the operator's proposed action would, for example, overload the machine. Additionally, the machine control system 115 may be used to provide automatic machine/tool control.

The controller 105 receives input from at least one of a plurality of critical parameters 120, an operator occupancy indicator 125, and a cool down enabler 130. Also, the controller 105 communicates with an engine cooling fan system 135, and a hydraulic cooling fan system 140.

The critical parameters 120 include at least one of a plurality of machine or engine status indicators. Some examples of machine status indicators are an electrical health indicator, a hydraulic oil temperature indicator, an implement oil pressure indicator, a swing oil pressure indicator, and a pilot oil pressure indicator. Some examples of engine status indicators are an oil pressure indicator, an oil level indicator, an oil temperature indicator, a coolant level indicator, and a coolant temperature indicator.

Stored in the controller 105 are predetermined shut down values 123. The predetermined shut down values 123 represent values, if attained by the critical parameters 120, could cause potential damage to the machine. For example, one predetermined shut down value 123 could be the minimum desirable amount of coolant fluid needed to keep the machine 100 operating without damage to the machines engine. The predetermined critical parameter values 123 would be inputted into the controller 105 at the factory, or by a service tool after the machine 100 has left the factory, or reset automatically by the control systems each time the machine 100 is turned on.

The use of critical parameters 120 for indicating current machine and engine status is well know in the art. One skilled in the art could easily and readily implement the present invention using a variety of different machine and engine status indicators other than those listed above.

Currently, there are a variety of operator occupancy indicators 125 available in the market place. Two examples of typical operator occupancy indicators 125 are seat pressure systems and seat lift arm systems. The seat pressure system incorporates a pressure sensor beneath the operators seat. The pressure sensor will communicate with a controller associated with the machine when a weight is placed on or removed from the operator seat. In the preferred embodiment, the seat lift arm system is used. The seat lift arm is positioned in a manner to force an operator to move the seat lift arm to a designated position when sitting down, and to move the seat lift arm to another designated position when exiting the machine. A seat lift arm sensor will communicate the position of the seat lift arm with the controller 105.

A cool down feature 130 allows the machine 100 to be cooled down prior to being shut down. The cool down feature 130 is either a software switch, incorporated into the machine control system 115 at the factory, or a manual switch accessible to the operator. When the cool down feature 130 is enabled, the controller 105 utilizes an engine cooling fan system 135 and a hydraulic cooling fan system 140 to controllably cool down the machine 100. Predetermined machine cool down values 133 have been previously stored in the controller 105, either at the factory or through a service tool, prior to machine operation.

Engine cooling fan systems 135 and hydraulic cooling fan systems 140 are well known to those familiar in the art. Typically, the engine cooling fan system includes a radiator and a fan. The fan induces cooling air flow to pass through the core of the radiator for engine cooling purposes. In this manner, the engine fan helps keep the engine within the predetermined normal operating cool down values 133 previously stored in the controller 105. Hydraulic cooling fan systems 140 make it possible to cool a heat exchanger on a machine remote from the machine engine. Most hydraulic cooling fan systems 140 include a fan connected to a fluid motor with the fluid motor being driven by fluid from a variable displacement pump. It is desirable to operate the fan at the predetermined cool down values 133 stored in the controller 105, which are representative of the temperature in the heat exchanger.

Figure 2:
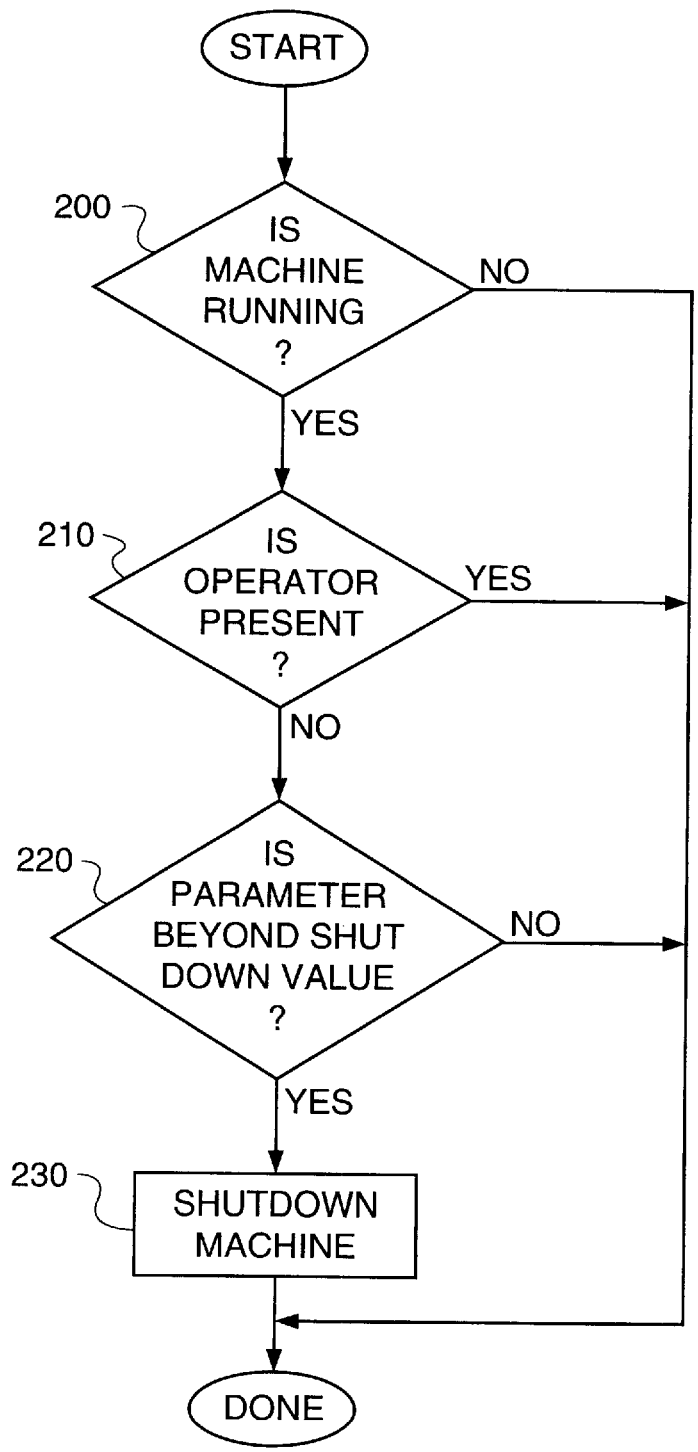
FIG. 2 is a is a flow diagram illustrating an embodiment of the method for automatically shutting down a machine during an operators absence.

Referring to FIG. 2, a flow diagram illustrating an embodiment of the method for automatically shutting down a machine 100 during an operators absence. In the first block 200 the controller 105 determines if the machine 100 is running using a variety of inputs from the machine control system 115 and the engine control system 110. If the machine 100 is not running the software control will exit the program loop. If, the machine 100 is running, the software control passes to block 210.

In block 210 the controller 105 determines if an operator is present using an operator occupancy indicator 125. In the preferred embodiment the operator occupancy indicator 125 is a seat lift arm system of the type designed to force an operator to move the seat lift arm to a designated position when occupying or exiting the machines operator seat. If the operator is present, the software control will exit the program loop. However, if the operator is not present the software control passes to block 220.

In block 220 the controller 105 determines if at least one of a plurality of critical parameters 120 in communication with the controller are beyond a predetermined shutdown value 123. For each of the critical parameters 120, a predetermined shutdown value 123 representing when a potentially damaging situation could occur if the machine is left running, has been stored in the controller 105. If the critical parameter 120 is not beyond a predetermined shutdown value, the software program will exit the program loop. But, if the critical parameter 120 is beyond a shutdown value the software control passes to block 230 where the machine 100 will be shutdown. To shutdown the machine 100, the controller 105 deactivates all energy and power sources, such as the engine and the electrical system operating from a machine battery. Methods for shutting down a machine are well known to one skilled in the art.

Figure 3:
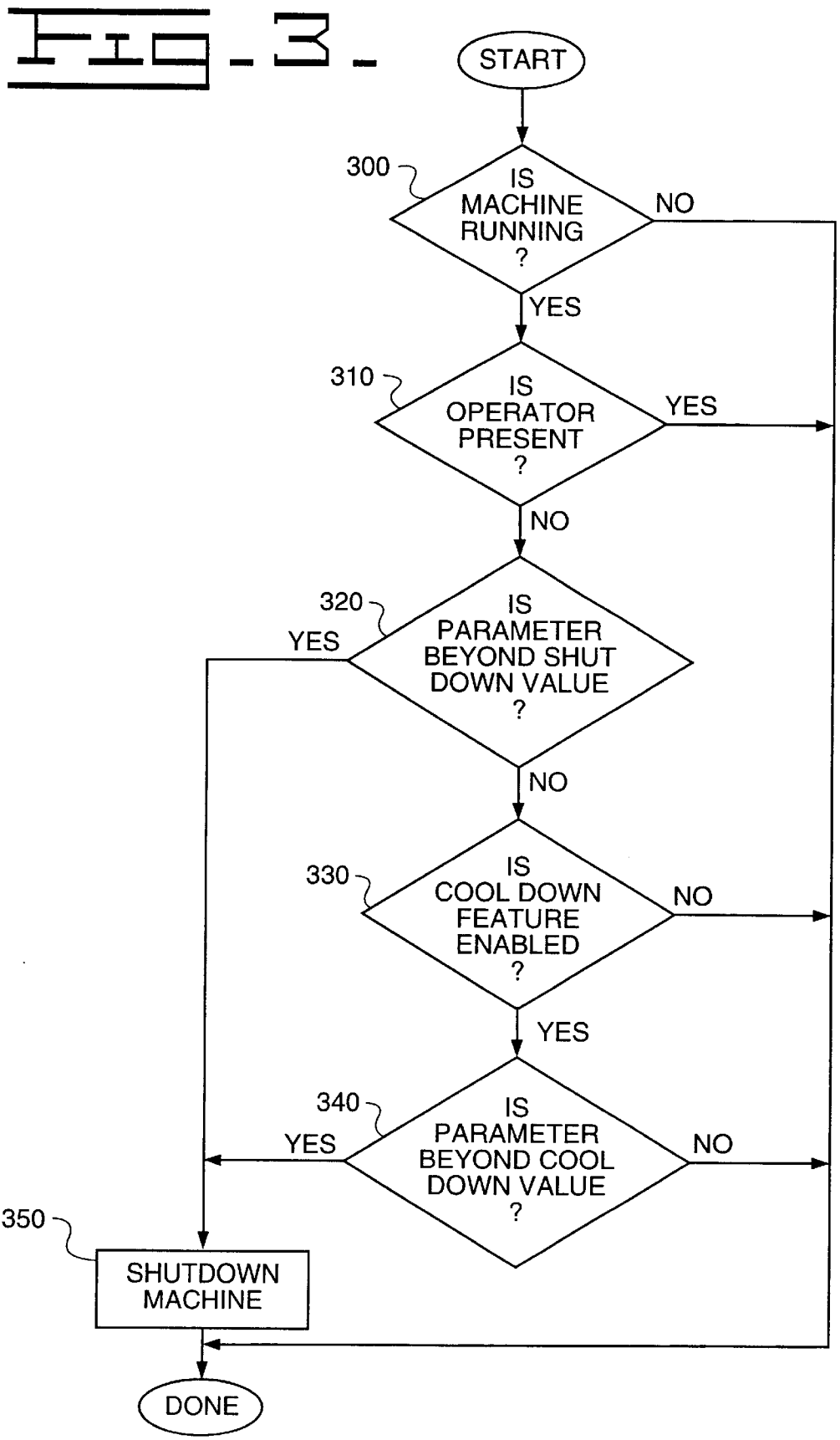
FIG. 3 is a is a flow diagram illustrating an additional embodiment of the method for automatically shutting down a machine during an operators absence.

Referring to FIG. 3, a flow diagram illustrating another embodiment of the method for automatically shutting down a machine 100 during an operators absence. As described above for FIG. 2, in the first block 300 the controller 105 determines if the machine 100 is running using a variety of inputs from the machine control system 115 and the engine control system 110. If the machine 100 is not running the software control will exit the program loop. If, the machine 100 is running, the software control passes to block 310.

Also as described above, in the next block 310 the controller 105 determines if an operator is present using an operator occupancy indicator 125. If the operator is present, the software control will exit the program loop. If, however, the operator is not present, the software control passes to block 320 where the controller 105 determines if at least one of a plurality of critical parameters 120 are beyond a predetermined shutdown value 123. If the critical parameter 120 is beyond a shutdown value the software control passes to block 350 where the machine 100 is shutdown. But, if the critical parameter 120 is not beyond a predetermined shutdown value, the software program passes to block 330.

In block 330 the controller 105 determines if a cool down feature 130 is enabled. The cool down feature 130 is a software or manual switch, that if enabled, indicates a desire for the machine 100 to be cooled down prior to being shutdown. If the cool down feature 130 is not enabled, the software program will exit the program loop. However, if the cool down feature 130 is enabled, the software program passes to block 340 where the controller 105 utilizes an engine cooling fan system 135 and a hydraulic cooling fan system 140 to controllably cool down the machine. Predetermined machine cool down values 133 have been previously stored in the controller 105 prior to machine operation.

If the controller 105 determines the machine is not cooled beyond the predetermined machine cool down value, the software program exits the program loop. However, if the controller 105 determines the machine is cooled beyond the predetermined machine cool down value, the software program passes to block 350 where the machine 100 is shutdown. As described above, to shutdown the machine 100, the controller 105 deactivates all energy and power sources, such as the engine and the electrical system operating from a machine battery.

Other aspects, and advantages of the present invention can be obtained from a study of the drawings, the disclosure and the appended claims.

What is claimed is:

1. A method for automatically shutting down a machine, comprising:

determining if the machine is running;

determining if an operator is present;

determining if at least one critical parameter has changed beyond a respective predetermined value, wherein damage to the machine results if the at least one critical parameter attains the predetermined value;

determining if a cool down feature is enabled;

enabling at least one of a hydraulic cooling fan system and an engine cooling fan system in response to determining if the cool down feature is enabled;

activating machine shutdown in response to the machine being running, the operator not being present, the at least one critical parameter being beyond the predetermined value, and the cool down feature not enabled;

activating machine cool down and then activating machine shutdown in response to the machine being running, the operator not being present, the at least one critical parameter being beyond the predetermined value, and the cool down feature enabled.

2. The method as set forth in claim 1 wherein determining if the cool down feature is enabled includes the operator enabling a manual switch.

3. The method as set forth in claim 1 wherein determining if the cool down feature is enabled includes enabling a software switch.

4. The method as set forth in claim 1, further comprising activating the machine shutdown in response to enabling at least one of a hydraulic cooling fan system and an engine cooling fan system.

\* \* \* \* \*

UNITED STATES PATENT AND TRADEMARK OFFICE
CERTIFICATE OF CORRECTION

PATENT NO.    : 6,577,909 B1
DATED         : June 10, 2003
INVENTOR(S)   : Mitchell J. McGowan et al.

It is certified that error appears in the above-identified patent and that said Letters Patent is hereby corrected as shown below:

<u>Title page,</u>
Item [73], should read -- Caterpillar S.A.R.L., Geneva, Switzerland (CH) --

Signed and Sealed this

Twenty-sixth Day of August, 2003

JAMES E. ROGAN
*Director of the United States Patent and Trademark Office*